J. IRVING.
Velocipede.
No. 89,149.
Patented April 20, 1869.
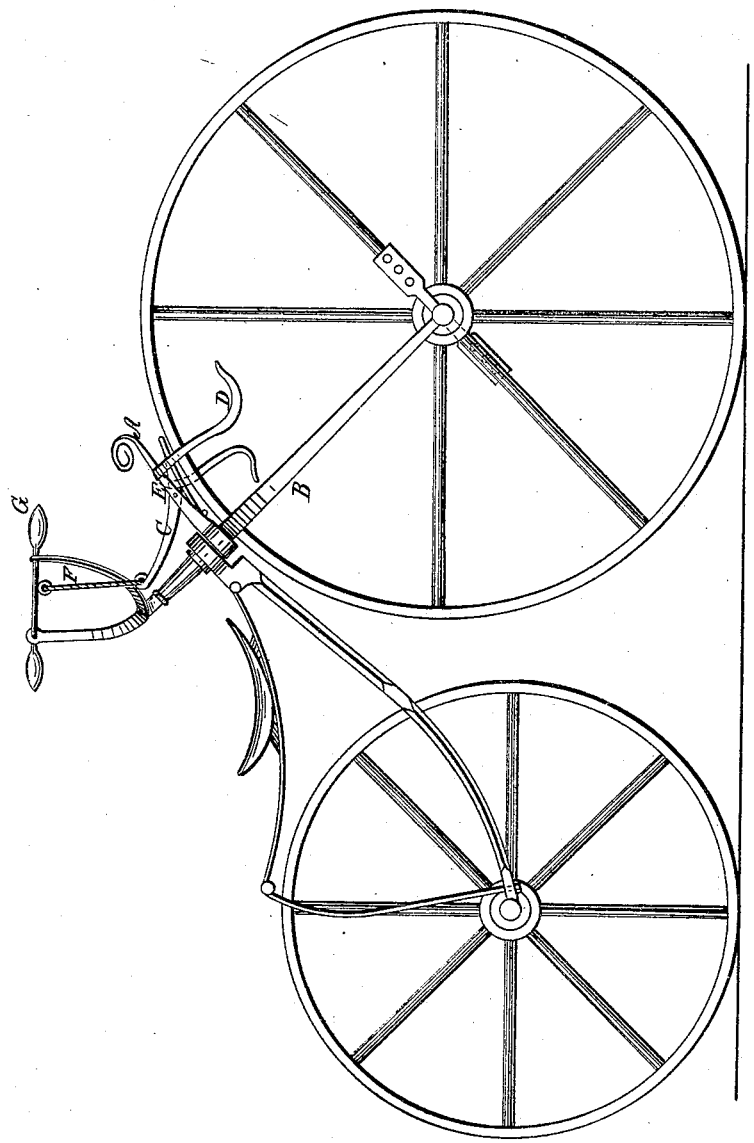
Witnesses,
Inventor,
J. Irving,
per Munn & Co.
Att'ys.

JOSEPH IRVING, OF NEW YORK, N. Y., ASSIGNOR TO A. T. DEMEREST AND COMPANY, OF THE SAME PLACE.

Letters Patent No. 89,149, dated April 20, 1869.

IMPROVEMENT IN VELOCIPEDES.

The Schedule referred to in these Letters Patent and making part of the same.

*To all whom it may concern:*

Be it known that I, JOSEPH IRVING, of New York, in the county of New York, and State of New York, have invented a new and useful Improvement in Velocipedes; and I do hereby declare that the following is a full, clear, and exact description thereof, which will enable others skilled in the art to make and use the same, reference being had to the accompanying drawing, forming part of this specification.

This invention relates to improvements in velocipedes, designed to provide an improved arrangement of brake-mechanism and leg-rests.

The drawing represents a side elevation of my improved velocipede.

My invention consists in providing a brake arranged to operate on the front wheel, to be operated from the guiding-lever, and capable of turning with the wheel as the latter is changed in its course for steering, and also in providing a leg-rest capable of turning with the said front wheel, the whole being arranged in a very simple and inexpensive manner.

I provide an arm, A, upon the crotch B, which turns with the front wheel immediately above the rim of the wheel, and projecting forward in line therewith, for supporting both the brake C and the leg-rests D.

The brake consists of a curved lever, pivoted at E to the arm A, having the lower short arm arranged in close proximity to the surface of the wheel, and the other long arm rising up toward the crotch of the steering-arms.

The said long arm is connected by a cord, F, with the steering-lever G, which is arranged so as to be rotated in its bearings and cause the application of the brake, by winding up the cord.

By this arrangement the brake is made capable of attachment and successful operation on the front wheel, no matter how much it may be turned in guiding the machine.

And the leg-rests, being similarly supported on the projecting-arm A, maintain the legs, when taken off the cranks, in going down hill, in the proper position relatively to the wheel, and thereby enable the operator to balance and maintain his position more easily.

It is desirable to apply the brakes to the front wheel, both because it can be controlled better and the machine can be balanced more easily than when applied to the hind wheel.

I claim as new, and desire to secure by Letters Patent—

1. The brake-lever C, suspended from the crotch B, and arranged to act upon and oscillate with the front wheel, substantially as specified.

2. The combination of the brake-lever C, suspended from the crotch and arranged to oscillate therewith, and guiding-lever G, when the latter is capable of rotation, and connected to the said brake-lever by a cord, F, substantially as specified.

3. The leg-rests D, supported upon the arm A, projecting from the oscillating crotch, substantially as specified.

The above specification of my invention, signed by me, this    day of    , 1869.

JOSEPH IRVING.

Witnesses:
JOHN E. SPRAGG,
EDWARD MURPHY.